United States Patent [19]

Wiener-Avnear

[11] 4,408,839

[45] Oct. 11, 1983

[54] TWISTED NEMATIC LIQUID LIGHT VALVE WITH BIREFRINGENCE COMPENSATION

[75] Inventor: Eliezer Wiener-Avnear, Carlsbad, Calif.

[73] Assignee: Hughes Aircraft Company, El Segundo, Calif.

[21] Appl. No.: 249,754

[22] Filed: Apr. 1, 1981

[51] Int. Cl.³ .............................................. G02F 1/133
[52] U.S. Cl. ................................ 350/347 R; 350/335; 350/342
[58] Field of Search ................... 350/335, 342, 347 R, 350/347 Y, 347 E

[56] References Cited

U.S. PATENT DOCUMENTS 3,881,808   5/1975   Gurtler et al. ...................... 350/335

OTHER PUBLICATIONS

Grinberg et al., *Optical Engineering,* vol. 14, No. 3, May–Jun. 1975, pp. 217–225.

*Primary Examiner*—F. L. Evans
*Attorney, Agent, or Firm*—John Holtrichter, Jr.; W. J. Bethurum; A. W. Karambelas

[57] ABSTRACT

This invention is a light valve using birefringent nematic liquid crystals in which compensation for residual birefringence is achieved by passing light through two separate liquid crystal layers having their major optical axes twisted oppositely along an axis parallel to the direction of light propagation and aligned perpendicular to one another at the interface between the two liquid crystal layers.

17 Claims, 6 Drawing Figures

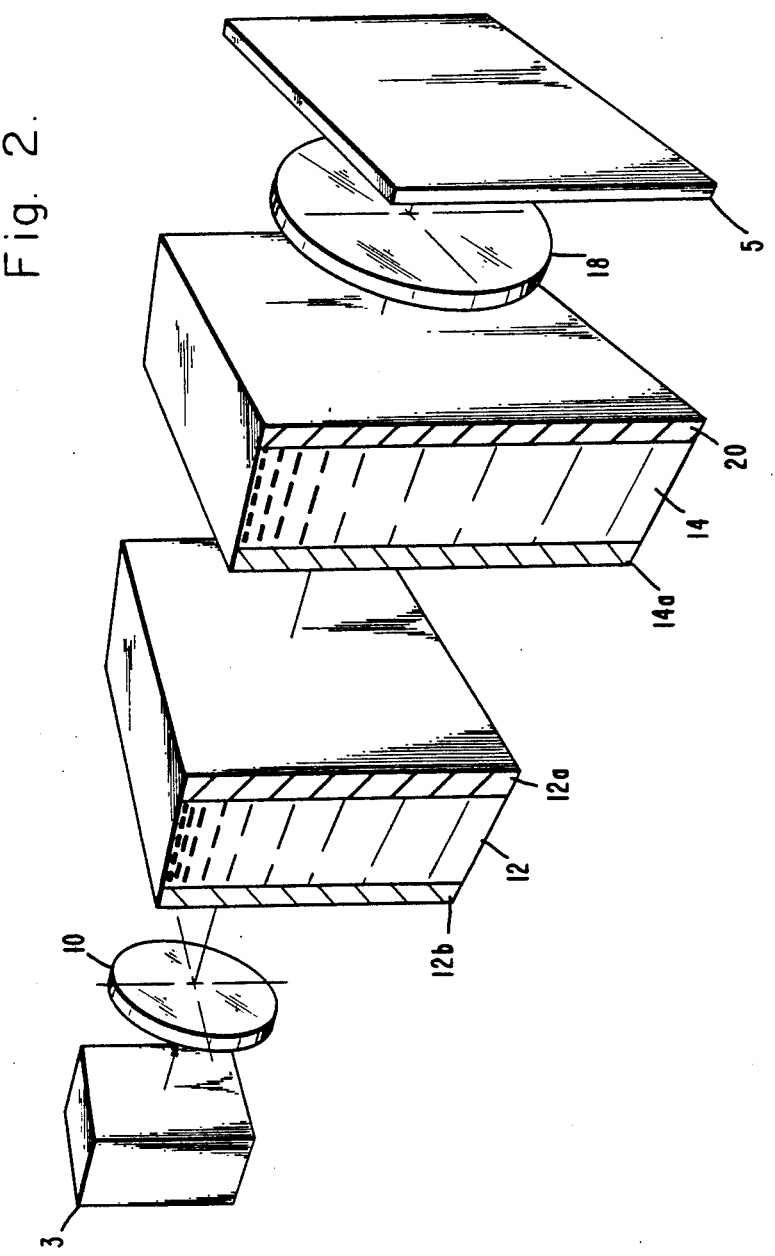

TWISTED NEMATIC LIQUID LIGHT VALVE WITH BIREFRINGENCE COMPENSATION

CROSS-REFERENCE TO RELATED APPLICATIONS

This application is related to U.S. patent application Ser. No. 249,753 filed Apr. 1, 1981 by Eliezer Wiener-Avnear and Jan Grinberg entitled "Liquid Crystal Light Valve With Birefringence Compensation" and assigned to Hughes Aircraft Company.

TECHNICAL FIELD

This invention is a light valve using birefringent nematic liquid crystals in which compensation for the null state residual birefringence is achieved by passing light through two separate liquid crystal layers having their major optical axes twisted in opposite directions along the direction of light propagation and being aligned perpendicular to one another at the interface between the two liquid crystal layers.

BACKGROUND OF THE INVENTION

A liquid crystal light valve useful for projecting bright images is discussed in Bleha et al, "Application of the Liquid Crystal Light Valve to Real Time Optical Data Processing", *Optical Engineering (The Journal of the Society of Photo-optical Instrumentation Engineers)*, July/August 1978, Vol. 17, No. 4, pages 371-384, the disclosure of which is incorporated by reference in its entirety into this application. The light valve described in the foregoing publication includes a twisted nematic liquid crystal which controls the transmission of light from a polarizer to an analyzer having its optical axis oriented perpendicular to the optical axis of the polarizer. In the null state, the projection light beam is transmitted through the liquid crystal, the angle of polarization of the light beam being rotated in one direction and then rotated in the opposite direction during the return trip through the liquid crystal so that it cannot pass through the analyzer. In the "on" state, an applied electric field across the thickness of the liquid crystal causes the optical axis of the liquid crystal to be tilted toward the direction of the electrical field. This introduces a phase change between the polarization components of the light which are parallel and perpendicular, respectively, to the optical axis of the liquid crystal. This phenomenon, occurring during the "on" state is termed "birefringence".

As a result, linearly polarized light incident on the liquid crystal is reflected back through the liquid crystal as elliptically polarized light which includes a component transmitted through the analyzer.

The quality of the image produced by such a light valve depends in large part upon the contrast ratio between the null state and the "on" state of the liquid crystal. Specifically, the less light transmitted through the liquid crystal in the null state, the greater the contrast ratio. A peculiar problem arises when more than one wavelength of light is to be controlled by the liquid crystal. For example, if the liquid crystal light valve is to be used in a color video system, it would be desirable to project (for example) red, blue and green light onto the liquid crystal. The incident light beam is resolved into two components in the liquid crystal having polarization electric field vectors which are parallel and perpendicular, respectively, to the major optical axis of the liquid crystal whenever the polarization direction of the incident light and the optical axis of the liquid crystal are not parallel. The problem is that a phase delay is introduced in the liquid crystal between the two components. This latter phase delay, occurring during the null state, shall be called null state birefringence and arises because the liquid crystal exhibits different refractive indices to the two light components so that the two components travel through the liquid crystal at different velocities. The light transmitted through the liquid crystal will be at least slightly elliptically polarized due to the phase delay between the two components so that, even in the null state, there will be a small component of light which will pass through the analyzer, thus making it impossible to achieve perfect darkness in the null state, thereby degrading the contrast ratio of the system. The birefringence discussed here is chromatic because it introduces different phase delays for different wavelengths or colors, and therefore is an especially significant problem when more than one wavelength or color of light is incident on the liquid crystal light valve. For example, if the null state birefringence is compensated at one wavelength, it will usually remain uncompensated at other wavelengths, thus making it impossible to achieve perfect darkness in the null state when a plurality of colors is used.

SUMMARY OF THE INVENTION

In the present invention, null state birefringence is compensated (so as to be eliminated) by the use of two nematic liquid crystal layers facing one another at two adjacent surfaces, their optical axes being twisted along the direction of light propagation in opposite directions and aligned perpendicular to one another at the adjacent surfaces. An image-controlling layer such as a cadmium sulfide photosensor array of the type discussed in the above-referenced publication controls the electric field applied across one of the liquid crystal layers. A polarizer filters the light received from a bright light beam projector while an analyzer having its optical axis oriented perpendicular to that of the polarizer filters the transmission of light from the liquid crystal to a viewing screen. The polarization direction of the polarized light from the polarizer 10 follows the twist of the first liquid crystal layer's optical axis so that the light polarization direction is twisted as it traverses the first liquid crystal layer. The light then enters the second liquid crystal layer and its polarization direction follows the opposite twist of the second layer's optical axis so that it is twisted back in the opposite direction as it traverses the second liquid crystal layer. The light beam passing through the first twisted nematic liquid crystal layer is resolved into two components parallel and perpendicular, respectively, to the first liquid crystal layer's twisted optical axis, and a phase shift according to the birefringence of the first liquid crystal layer is introduced between the two components. The light beam thus becomes elliptically polarized, the major axis of the ellipse of polarization of the light being parallel to the liquid crystal major optical axis. Because the optical axis is twisted along the direction of light propagation, the major axis of the ellipse of polarization of the light follows this twist.

The light then enters the second liquid crystal, where the major axis of the light beam polarization ellipse is perpendicular to the major optical axis of the second liquid crystal layer.

As the light traverses the second liquid crystal layer, the major axis of the light polarization ellipse follows the twist of the optical axis of the second layer, so that the ellipse of light polarization is twisted in the opposite sense until it is returned to the original orientation established by the polarizer. Simultaneously, an opposite compensating phase shift between the two polarized components of the light beam is introduced in the second layer which compensates for the phase shift previously introduced in the first liquid crystal layer. The phase shift between the two light components therefore diminishes as the beam traverses the second liquid crystal layer so that the light beam polarization is gradually transformed from elliptical to linear.

Compensation of the phase delay occurs in the second liquid crystal layer because the minor axis component of the ellipse of polarization of the light transmitted through the first liquid crystal layer is parallel to the major optical axis of the second liquid crystal layer while the major axis component of the ellipse of polarization of the light in the first liquid crystal layer is parallel to the minor axis in the second liquid crystal layer. Accordingly, an opposite phase shift of the same magnitude occurs in the second liquid crystal layer, thus undoing what occurred previously in the first liquid crystal layer. The result is that there is no phase delay in the light transmitted through the two liquid crystal layers, the null state birefringence having been thus compensated and thereby removed. Accordingly, the transmitted light is linearly polarized in the same initial direction established by the polarizer, regardless of the wavelength, so that none of it passes through the analyzer. Thus, the null state of the compensating liquid crystal light valve of this invention permits virtually no transmission of light, thus maximizing the contrast ratio of the system.

In the "on" state, when light is incident on the photosensor layer, the electric field across the second liquid crystal layer is changed so that there is no compensation and the light transmitted therethrough remains elliptically polarized. That component of the elliptically polarized light which is parallel to the polarization direction of the analyzer is transmitted through the analyzer to illuminate the screen.

The invention encompasses any light valve of oppositely twisted birefringent layers in which the alignment of the nematic liquid crystal molecules is perpendicular between the layers so that compensating phase shifts are created in each of the liquid crystals in such a manner as to precisely null the total birefringence.

DESCRIPTION OF THE DRAWINGS

The invention is best understood by reference to the accompanying drawings, of which:

FIG. 1c is a simplified schematic diagram modeling the operation in the "on" state of the light valve of FIG. 1a;

FIG. 2 is a simplified schematic diagram of an alternative embodiment of the device of FIG. 1a;

FIG. 3b is a simplified schematic diagram illustrating the operation in the "on" state of the device corresponding to FIG. 3a.

DETAILED DESCRIPTION OF THE INVENTION

Figure 1A:
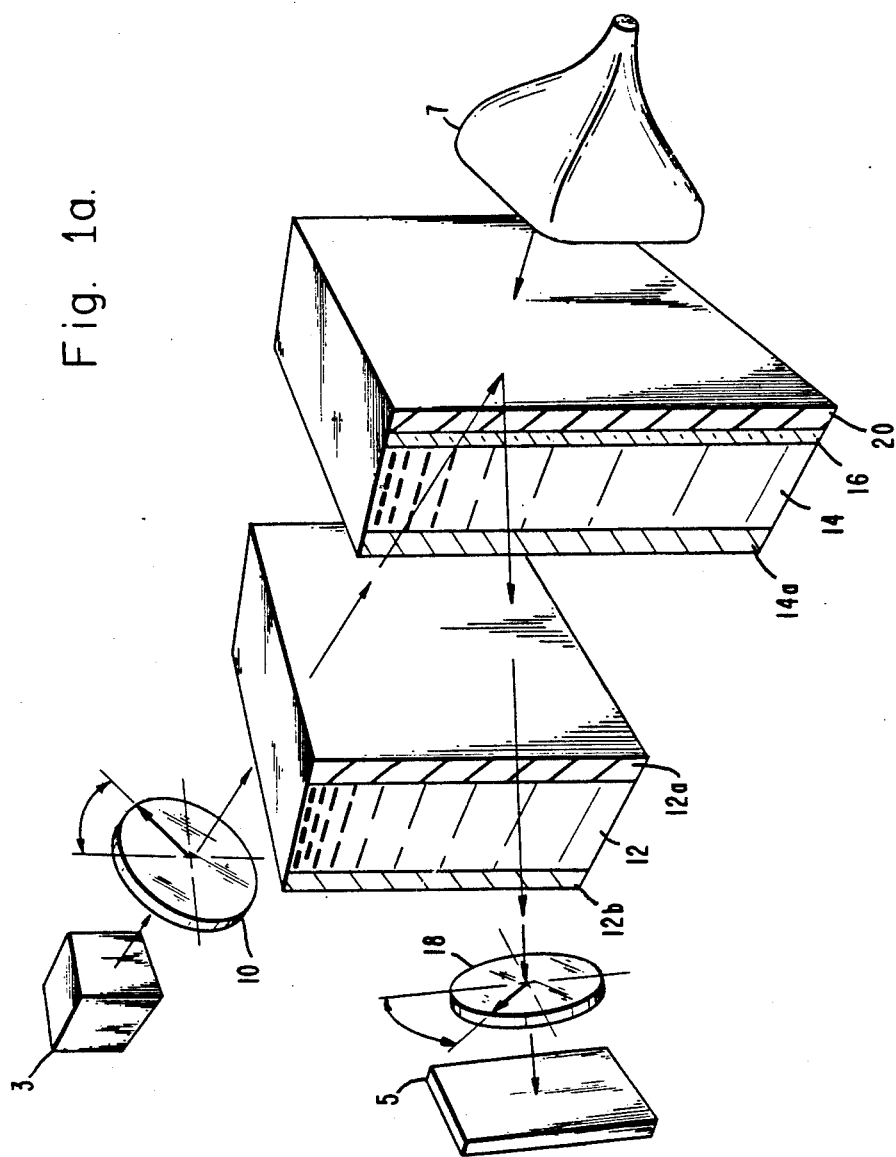
FIG. 1a is a simplified schematic diagram of a related invention claimed in the above referenced application.

FIG. 1a illustrates the use of a liquid crystal liquid valve 1 for modulating light from a bright beam projector 3 viewed on a screen 5 in response to a writing light source 7 which may be, for example, a cathode ray tube.

The light from the projector 3 passes through a polarizer 10, passes through a first liquid crystal layer 12, then through a second liquid crystal layer 14, whereupon it is reflected at the surface of a mirror 16 and again traverses the second and first liquid crystal layers 14, 12 (in that order) and is incident upon an analyzer 18. If the light passes through the analyzer 18, it then illuminates the screen 5.

Figure 1B:
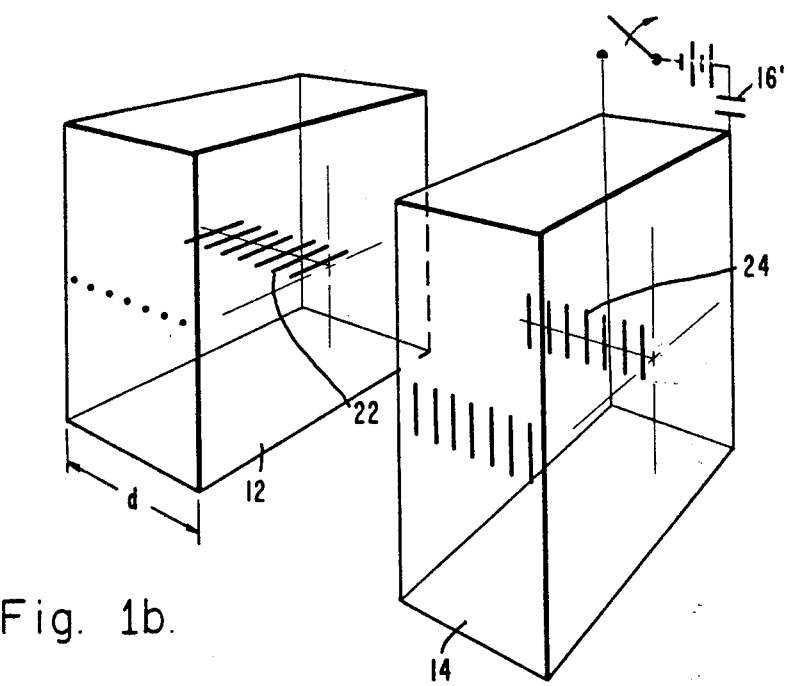
FIG. 1b is a simplified schematic diagram modeling the operation of the light valve of FIG. 1a in the null state.

As illustrated in FIG. 1b, the polarizer 10 is oriented at a 45° angle with respect to vertical while the analyzer 18 is oriented at −45° with respect to vertical. The optical axis of the first crystal layer 12, corresponding to the long molecular axes of the nematic liquid crystal molecules therein, is parallel to the horizontal, while the optical axis of the second liquid crystal layer 14 is vertical.

Referring to FIG. 1a, the liquid crystal layer 12 is sandwiched between two electrodes 12a, 12b across which a suitable potential $V_{dc}$ may be applied in a manner well-known to those skilled in the art. The second liquid crystal layer 14 is sandwiched between an electrode 14a and the mirror 16. The horizontal optical axis of the first liquid crystal layer 12 is established during manufacture in a manner well-known to those skilled in the art by surface non-uniformities delineated on the interior surfaces of the electrodes 12a, 12b so as to extend horizontally and contact the liquid crystal, and by an appropriate electric field applied between the two electrodes 12a, 12b. The vertical optical axis of the second liquid crystal layer 14 is established in a similar manner. The electric field across the second liquid crystal layer 14 is modulated by means of a photosensor layer 20 facing the writing light source 7. The photosensor layer 20 may be of the type discussed in the Bleha publication referenced above. Alternatively, the layer 20 may, instead of responding to the writing light source 7, respond to an electronic input such as a video signal. In this alternative case, the layer 20 could be an array of electrodes controlled by a plurality of transistors or a charge coupled device array as described in U.S. patent application Ser. No. 153,304 filed May 27, 1980 by Craig P. Stephens entitled "CCD Capacitance Modulation Matrix" and assigned to the assignee of the present application.

In FIG. 1b, the photosensor layer 20 is modeled as a switch 20' while the mirror 16 is modeled as a capacitor 16'. Major optical axes 22, 24 of the first and second liquid crystal layers 12, 14, respectively, are each illustrated in FIG. 1b as a series of parallel lines corresponding to the long axes of the nematic liquid crystal molecules. In the null state illustrated in FIG. 1b, the photosensor layer 20 receives no light from the source 7 and therefore does not change the electric field across the liquid crystal layer 14. Accordingly, in FIG. 1b the switch 20' is illustrated in the open position. Thus, the alignment of the optical axis 24 of the liquid crystal layer 14 is unchanged from its initial vertical orientation established during manufacture.

The beam from the projector 3 passes through the polarizer 10 and becomes linearly polarized at a 45° angle parallel to the orientation of the polarizer 10. As it travels through the first liquid crystal layer 12, it is resolved into two components parallel and perpendicular, respectively, to the horizontal optical axis 22 of the liquid crystal layer 12. As is well-known to those skilled in the art, the liquid crystal birefringence causes a phase shift $\Delta\phi_1$, to be introduced between the two components of the liquid as they travel through the first liquid crystal layer 12. The phase shift arises because the liquid crystal 12 exhibits two different indices of refraction, $n_{parallel}$, $n_{perpendicular}$, to light polarized in a direction parallel and perpendicular, respectively, to the major optical axis 22. The phase shift $\Delta\phi_1$ is proportional to the difference $\Delta n$, between the index of refraction $n_{parallel}$ of the liquid crystal layer for the component of light polarized parallel to the optical axis 22 and the index of refraction $n_{perpendicular}$ of the liquid crystal for the component of light polarized perpendicular to the optical axis 22. The phase shift $\Delta\phi_1$ is also proportional to the thickness d, of the liquid crystal layer 12, and to the reciprocal of the wavelength $\lambda$ of the light. The light is transformed from linearly polarized light to elliptically polarized light according to the phase shift so that the light exists the first liquid crystal layer as elliptically polarized light.

The light then enters the second liquid crystal layer 14. However, the optical axis 24 of the second liquid crystal layer 14 is perpendicular to the optical axis 22 of the first layer 12. Accordingly, the component of light which was parallel to the optical axis 22 in the first liquid crystal layer 12 is now perpendicular to the optical axis 24 of the second liquid crystal layer 14, the converse being true of the perpendicular component. Thus, in each liquid crystal layer, each of the two polarized components of the light travel through a first refractive medium 12 of one of the indices $n_{parallel}$ and $n_{perpendicular}$, and then travels through a second medium 14 of the other index. Assuming, for example, that the first and second liquid crystal layers 12 and 14 are of the same thickness and have the same perpendicular and parallel refractive indices, respectively, a phase shift $\Delta\phi_2$ of the same magnitude but of opposite polarity as $\Delta\phi_1$, will occur between the two components as they traverse the thickness of the second liquid crystal layer 14, so that $\Delta\phi_2 = -\Delta\phi_1$ and the total phase shift through both layers 12, 14, $\Delta\phi_1 + \Delta\phi_2$, is exactly zero.

At this point, the light is linearly polarized in the original direction initially established when it first passed through the polarizer 10. The light is then reflected at the mirror 16 and the entire process is then repeated in reverse sequence. Accordingly, the light traverses the second liquid crystal layer 14, then traverses the first liquid crystal layer 12 and is incident on the analyzer 18. Again, at this point, the light is linearly polarized in the original direction initially established when it first passed through the polarizer 10. Because the analyzer is oriented with its optical axis perpendicular to that of the polarizer 10, the light does not pass through the analyzer 18 in the null state of FIG. 1b so that the screen 5 is perfectly dark.

Significantly, the cancellation of the phase shift between the two components of the light occurs for all wavelengths of light incident on the light valve 1. Accordingly, the darkness achieved in the null state of FIG. 1b is independent of the wavelength of the light so that the device is useful for achieving a dark null state in a color video system wherein null state birefringence is completely compensated for all colors of light.

Figure 1C:
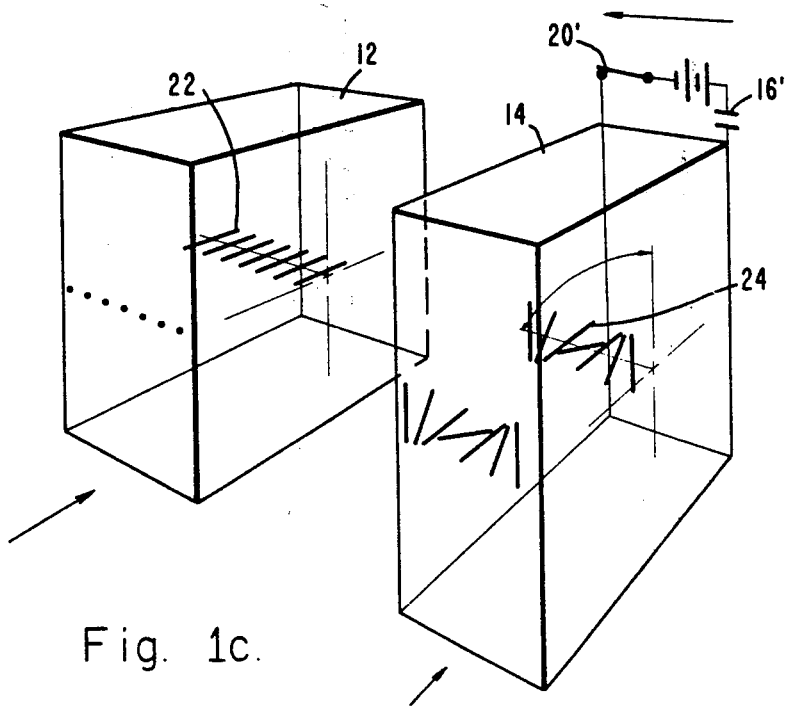

The "on" state illustrated in FIG. 1c occurs whenever the writing light source illuminates at least a portion of the photosensor layer 20. FIG. 1c illustrates an example wherein the writing light source 7 illuminates the entire photosensor layer 20, thus imposing a uniform electric field across the entire liquid crystal layer 14. Accordingly, FIG. 1c illustrates the switch 20' in the closed position.

The direction of the electric field applied by the photosensor layer 20 is perpendicular to the plane of the electrode 14a and generally parallel to the direction of propagation of light through the liquid crystal. Accordingly, FIG. 1c illustrates the switch 20' in the closed position. It should be understood, of course, that the photosensor layer may impose an electric field across a selected number of pixels in selected locations of the liquid crystal layer 14 in order to create an image corresponding to the image projected by the writing light source 7.

The electric field imposed across the liquid crystal layer 14 is of sufficient magnitude to tilt the liquid crystal molecules toward the direction of the electric field. As discussed in the Bleha publication, the tilt of the molecules is at a maximum in the center of the liquid crystal layer, the molecules immediately adjacent the electrode 14a and the mirror 16 being substantially unaffected by the electric field applied by the photosensor layer 20. As is well-known to those skilled in the art, the change in polarization of the light passing through the liquid crystal layer 14 is different from that in the liquid crystal layer 12 due to the tilted orientation of the liquid crystal molecules, so that there is no compensation of the birefringence when the light passes through the second liquid crystal layer 14. Thus, a light beam projected from the projector 3 is polarized linearly by the polarizer 10 at a +45° angle, passes through the first liquid crystal layer 12 where it is elliptically polarized as discussed previously and then passes through the second liquid crystal layer 14 where it is further elliptically polarized (without the compensation of the null state). The light is then reflected at the mirror 16 and the reverse process is repeated, the resultant light beam exiting the liquid crystal layer 12 toward the analyzer 18 and being elliptically polarized. The elliptically polarized light incident on the analyzer 18 contains an electric field component which is parallel to the optical axis of the analyzer 18. This component passes through the analyzer 18 and illuminates the screen 5.

FIG. 2 illustrates an alternative embodiment of the device of FIG. 1a in which the mirror 16 is eliminated and the polarizer and analyzer are placed on opposite sides of the light valve 1, the projector 3 projecting light which is transmitted through the light valve 1 where it illuminates the screen 3 on the opposite side of the light valve 1. It should be apparent from the foregoing that the device of FIG. 2 operates in the same way as the device of FIG. 1a to precisely compensate for the residual birefringence in each of the liquid crystals 12, 14 in the null state, except that the light from the projector 3 passes through each of the liquid crystals 12, 14 once only.

Analysis

Birefringence in the liquid crystal is defined by the difference between the refractive index $n_{parallel}$ of the liquid crystal for light polarized in a direction parallel to the major optical axis and the refractive index $n_{perpendicular}$ of the liquid crystal for light polarized perpendicular to the major optical axis. The parallel refractive index $n_{parallel}$ and the perpendicular refractive index $n_{perpendicular}$ define the birefringence $\Delta n$ of the liquid crystals as follows:

$$\Delta n = n_{parallel} - n_{perpendicular}.$$

The phase delay $\Delta\phi$ introduced between the parallel and perpendicular polarized components of light of wavelength $\lambda$ traveling through a liquid crystal of thickness d may be computed from the birefringence $\Delta n$ and the thickness d of the liquid crystal as follows:

$$\Delta\phi = (2\pi)(\Delta n)(d/\lambda)$$

The purpose of the invention is to eliminate any phase change $\Delta\phi$ for all wavelengths of light passing through the first and second liquid crystal layers 12, 14 in the null state. If the first liquid crystal layer 12 has a birefringence $\Delta n_1$ and a thickness $d_1$ and the second liquid crystal layer 14 has its own birefingence $\Delta n_2$ and its own thickness $d_2$ which are different from the first liquid crystal layer 12, elimination of the phase shift for light of any wavelength $\lambda$ may be achieved by maintaining the total change in phase $\Delta\phi$ across both the first and second liquid crystal layers 12, 14 equal to zero. From the foregoing, it may be shown that the change in phase $\Delta\phi$ is zero as long as the following condition is met:

$$\Delta n_1 d_1 - \Delta n_2 d_2 = 0.$$

This condition is typically independent of the wavelength $\lambda$ so that the change in phase is zero for any color of light. Thus, the null state birefringence in each of the liquid crystal layers 12, 14 is precisely compensated for all colors of light simultaneously.

Birefringence Compensation with Twisted Nematic Liquid Crystals

Figure 3A:
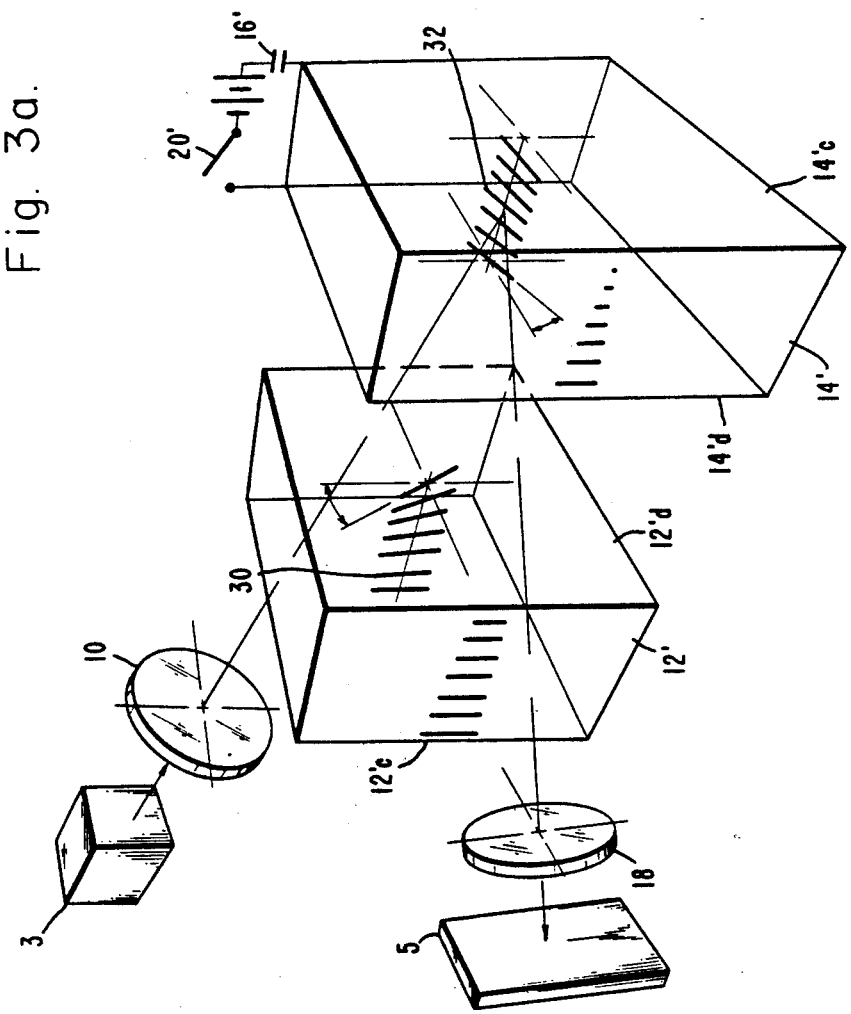
FIG. 3a is a simplified schematic diagram of the present invention including two twisted nematic liquid crystal layers, FIG. 3a modeling the device operation in the null state.

FIG. 3a is a simplified schematic diagram of the present invention claimed in this application, in which a pair of twisted nematic liquid crystal layers 12', 14' having major optical axes 30, 32, respectively, replace the linear nematic liquid crystal layers 12, 14, respectively, of the light valve 1 of FIG. 1a. However, in FIG. 3a, the polarizer 10 has its optical axis oriented in the vertical direction while the analyzer 18 has its optical axis oriented in the horizontal direction. The first liquid crystal layer 12' has its major optical axis 30 twisted along the direction of propagation of the light so that at its front face 12'c the optical axis 30 is vertical while at its back face 12'd the optical axis 30 is twisted to 22.5° from vertical. The second liquid crystal layer 14' has its major optical axis 32 twisted in the opposite sense along the direction of light propagation and is generally perpendicular to the optical axis 30 of the first liquid crystal layer 12 so that, at its front face 14c, the optical axis 32 is horizontal while, at its back face 14'd, the optical axis 32 is twisted by 22.5° from horizontal. The two back faces 12'd, 14'd face one another so that, at the interface between the two liquid crystal layers 12', 14' their major optical axis 30, 32 are perpendicular.

In the null state, the electric field across the liquid crystal layer 14' is not changed by the photosensitive layer 20 so that the light valve of FIG. 3a projects no light on the screen 5. The polarization direction of the vertically polarized light from the polarizer 10 follows the twist of liquid crystal optical axis 30 so that the light polarization direction is twisted through the angle 22.5° as it traverses the first liquid crystal layer 12'. The light then enters the second liquid crystal layer 14'. The polarization direction of the light now follows the twist of the optical axis 32 and it is twisted back in the opposite direction as it traverses the second liquid crystal layer 14' through the same angle 22.5°. The light beam is then reflected at the mirror 16 and the reverse process is performed so that the light again passes through the second liquid crystal layer 14' in the opposite direction, then passes through the first liquid crystal layer 12' and is incident upon the analyzer 18. As the light exits the first liquid crystal layer 12' its direction of polarization has been rotated back to the vertical and so it cannot pass through the analyzer 18.

As is well-known to those skilled in the art, birefringence is inherent in a thin twisted nematic liquid crystal configuration so that, as the polarization vector of the light passing through the liquid crystal layer 12' is rotated, some elliptical polarization also occurs. Thus, the light beam passing through the twisted nematic liquid crystal layer 12' is resolved into two components parallel and perpendicular, respectively, to the liquid crystal major optical axis 30, and a phase shift proportional to the birefringence $\Delta n$ and thickness d of the liquid crystal layer 12' is introduced between the two components. The light beam thus becomes elliptically polarized as it passes through the liquid crystal layer 12', the major axis of the ellipse of polarization of the light being parallel to the liquid crystal major optical axis 30. Because the optical axis 30 is twisted through 22.5° along the direction of light propagation, the major axis of the ellipse of polarization of the light follows this twist and so, at the back face 12'd, the light polarization ellipse is rotated 22.5° from vertical.

The light then enters the second liquid crystal 14' at its back face 14'd, where the major axis of the light beam polarization ellipse 40 is perpendicular to the major optical axis 32 of the second liquid crystal layer 14'.

As the light traverses the second liquid crystal layer 14', the axis of the light polarization ellipse follows the twist of the optical axis 32 of the second layer 14', so that the ellipse is twisted in the opposite sense toward the vertical. Simultaneously, an opposite phase shift between the two polarized components of the light beam is introduced which compensates for the phase shift previously introduced in the first liquid crystal layer 12'. The phase shift between the two light components therefore diminishes as the beam traverses the second liquid crystal layer 14' so that the light beam polarization is gradually transformed from the ellipse to a straight vertical line.

This entire process may be recognized by imagining that the ellipse travels from left to right through the second liquid crystal layer 14' of FIG. 3a, but that, as it so travels, the major axis, or longest axis, of the ellipse is rotated toward the vertical, while simultaneously the ellipse becomes more elongate as its minor axis, or shortest axis, becomes even shorter and the ellipse is transformed into a vertical straight line by the time it reaches the front face 14'c of the second liquid crystal layer 14'.

The phase shift introduced between the two light polarization components in the second liquid crystal layer 14' is opposite to that introduced in the first layer 12' because the major elliptical polarization axis of the light beam (corresponding to the major axis of the ellipse) is parallel to the major liquid crystal optical axis 30 of the first layer 12' and perpendicular to the axis 32 of the second layer so that the propagation velocity along the major elliptical polarization axis is governed by the parallel refractive index $n_{parallel}$ in the first layer 12' and by the perpendicular refractive index $n_{perpendicular}$ in the second layer 14'. The converse is true of the minor elliptical axis of polarization of the light beam. Thus, the total phase shift across both layers 12', 14' is zero.

The light is reflected at the mirror 16 and passes back through the layers 12', 14', and the reverse process occurs, so that the light emerges from the front face 12'c of the first layer 12' as vertically polarized light and is blocked by the horizontally polarized analyzer 18. As in the embodiment of FIG. 1b, the null state is achieved whenever the switch 20' is opened, corresponding to an absence of light on the photosensor layer 20 of FIG. 1a.

Although the phase shifts introduced between the two light polarization components in each of the layers 12', 14' are different for different wavelengths of light, the null state of this device is achieved for all colors of light simultaneously because the total phase shift across both layers 12', 14' is zero for any wavelength of light. Thus, a dark screen is realized for all colors of light, thereby providing a maximum contrast ratio while the device is used with one or many colors of light.

Figure 3B:
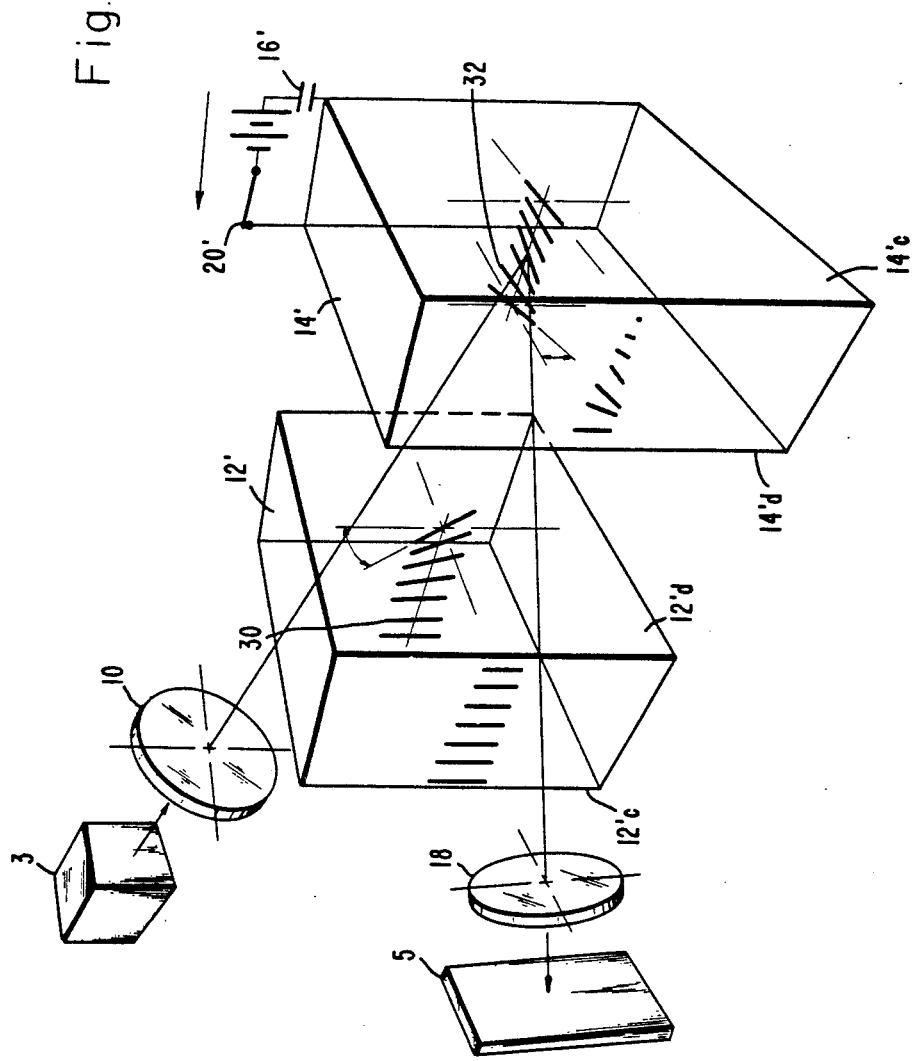

The "on" state illustrated in FIG. 3b is achieved whenever the photosensor layer 20 is illumined, corresponding to a closure of the switch 20'. The resulting electric field across the thickness of the second liquid crystal layer 14' causes the already twisted nematic molecules of the liquid crystal layer to be tilted in a direction parallel to the electric field (which is generally parallel to the direction of light propagation and also parallel to the axis about which the molecules are nematically twisted). The resulting twist and tilt of the optical axis 32 corresponds to the configuration indicated in the simplified schematic diagram of FIG. 3b. As in the embodiment of FIG. 1, the tilt affects the elliptical polarization of the light passing through the second liquid crystal layer 14' in a different manner (well known in the art so that the elliptical polarization in the first liquid crystal layer 12' is uncompensated in the second liquid crystal layer 14' and so the light incident on the analyzer 18 remains elliptically polarized and a linear component of it passes through the analyzer and illuminates the screen 5.

FIG. 2 illustrates an alternative arrangement of the twisted nematic liquid crystal light valve of FIGS. 3a and 3b in which the analyzer 16 and screen 5 are moved to the opposite side of the two liquid crystal layers 12', 14' and the mirror 16 is eliminated. From the foregoing, it should be apparent that the embodiment of FIG. 2 operates in the same way as the embodiment of FIGS. 3a and 3b, the exception being the elimination of the mirror, the light in the embodiment of FIG. 2 traveling through the liquid crystal layers 12', 14' once only.

The advantage of the present invention illustrated in FIGS. 3a and 3b is that the birefringence of the liquid crystal is exactly compensated substantially independently of any variations in thickness of each of the two liquid crystal layers. It should be remembered that the compensation of birefringence in the light valve of FIGS. 1a, 1b and 1c was a function of the difference of the product of the birefringence and thickness of each of the liquid crystal layers 12, 14. It can be shown analytically that a variation $\Delta d$ in the thickness d of each of the individual liquid crystal layers 12', 14' in the twisted nematic liquid crystal light valve of the present invention shown in FIGS. 3a, 3b degrades the illumination contrast ratio between the null and "on" states by only a factor of $(\Delta d/d)^2$. Thus, as long as the variation in thickness of each of the liquid crystal layers 12', 14' is sufficiently small, it will have a negligible effect on the birefringence compensation, a significant improvement.

Other embodiments not described herein may be realized within the spirit and scope of this invention. For example, a birefringent material other than liquid crystals may be substituted for the layers 12, 12', 14, 14'. Although the embodiment of FIGS. 3a and 3b was described as having a nematic twist of 22.5°, angles other than 22.5° may be selected within the scope of the invention.

What is claimed is:

1. A light valve for controlling light propagating along an axis of propagation, said light valve comprising:

a pair of optically birefringent layers, each of said layers having a front surface and a back surface facing the back surface of the other layer, said front and back surfaces being nonparallel to said propagation axis;

each of said layers having a major optical axis corresponding to parallel refractive indices exhibited to radiation components polarized in a direction parallel to said optical axis and perpendicular refractive indices exhibited to radiation components polarized in a direction perpendicular to said optical axis;

wherein said optical axis of one of said two layers at its back surface is substantially perpendicular to the optical axis of the other of said two layers at the back surface of said other layer and said optical axis of one of said two layers at its front surface is substantially perpendicular to the optical axis of the other of said two layers at the front surface of said other layer and each is twisted along said axis of propagation in opposite directions with respect to the other; and means for polarizing light incident on said front surface of one of said layers so that said incident light may resolve into said parallel and perpendicular radiation components in said one layer and so that a total phase shift of substantially zero is introduced between said parallel and perpendicular radiation components as they travel along said propagation axis through both said two layers.

2. The light valve of claim 1 wherein at least one of said birefringent layers comprises a liquid crystal layer including a plurality of twisted nematic liquid crystal molecules aligned so as to define said optical axis of said layer.

3. The light valve of claim 1 wherein said optical axis of each of said layers is nematically twisted between the parallel faces of said layers by an angle on the order of 22.5°.

4. The light valve of claim 1 wherein one of said birefringent layers comprises a liquid crystal layer including a plurality of nematic liquid crystal molecules twisted so as to define the twisted optical axis of said one layer, said light valve further comprising means for causing the optical axis of said liquid crystal layer in at least some locations in said layer to tilt from their original orientation toward a direction parallel to the axis of said twist.

5. The light valve of claim 1 wherein said polarizing means comprises a polarizer for filtering light incident upon said light valve, said light valve further comprising an analyzer for filtering light transmitted through said two layers, said polarizer and analyzer each having a polarization axis oriented at right angles to one another.

6. The light valve of claim 1 wherein one of said birefringent layers comprises a liquid crystal layer including a plurality of nematic molecules twisted so as to define the twisted optical axis of said one layer, said light valve further comprising:

means for at least partially tilting said alignment of at least some of said nematic molecules toward a direction parallel to the axis of said twist in response to an image input; and an analyzer, said analyzer and polarizing means each having a polarization axis perpendicular to that of the other.

7. The light valve of claim 1 wherein each of said layers is of approximately the same thickness and has approximately the same parallel refractive index as the other and approximately the same perpendicular refractive index as the other.

8. A light valve comprising:

a pair of birefringent layers each having its major optical axis aligned perpendicular to that of the other at an interface between said layers and twisted in opposite directions;

a polarizer for filtering light incident upon said light valve;

an analyer for flitering light transmitted through said two layers wherein said polarizer and analyzer each have a polarization direction perpendicular to that of the other; and means responsive to an input image for at least partially tilting the optical axis of one of said birefringent layers in at least some locations therein toward a direction parallel to the direction of propagation of said incident light.

9. The light valve of claim 8, wherein said one birefringent layer comprises nematic liquid crystal molecules aligned so as to define said optical axis of said one layer.

10. The light valve of claim 9 wherein said tilting means comprises means for applying an electric field across said one layer in a direction generally parallel to the direction of light propagation so as to cause at least some of said nematic liquid crystal molecules to tilt alignment toward the direction of said electric field.

11. The light valve of claim 10 wherein said tilting means responds to a writing light source.

12. The light valve of claim 10 wherein said tilting means responds to an electric signal input.

13. The light valve of claim 8 further comprising a bright beam projector transmitting light to said two layers through said polarizer.

14. A light valve comprising a pair of birefringent layers each having a major optical axis and means for controllably tilting said optical axis of one of said layers in at least a portion thereof in response to an image input, said optical axis of each of said layers being oriented with respect to that of the other and each being oppositely twisted so that the birefringence of each of said layers compensates for that of the other in the absence of said image input.

15. A light valve comprising a pair of birefringent layer each having a major optical axis and means for controllably tilting said optical axis of one of said layers in at least a portion thereof in response to an image input, said optical axis of each of said layers being twisted in an opposite sense and being substantially perpendicular to that of the other.

16. The light valve of claims 14 or 15 wherein said one layer is a liquid crystal layer.

17. The light valve of claims 14 or 15 further comprising a polarizer and a crossed analyzer facing said two layers.

* * * * *